R. F. PHILLIPS AND L. J. McCLOSKEY.
WASHER FOR MINE CAR WHEELS.
APPLICATION FILED JAN. 30, 1922.
1,423,877.
Patented July 25, 1922.
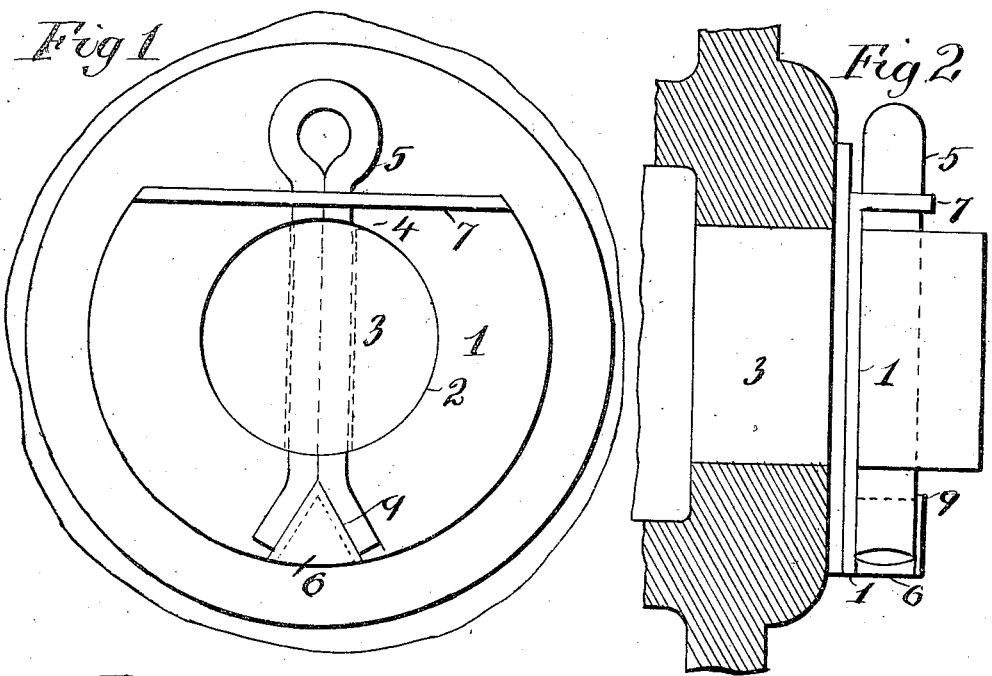
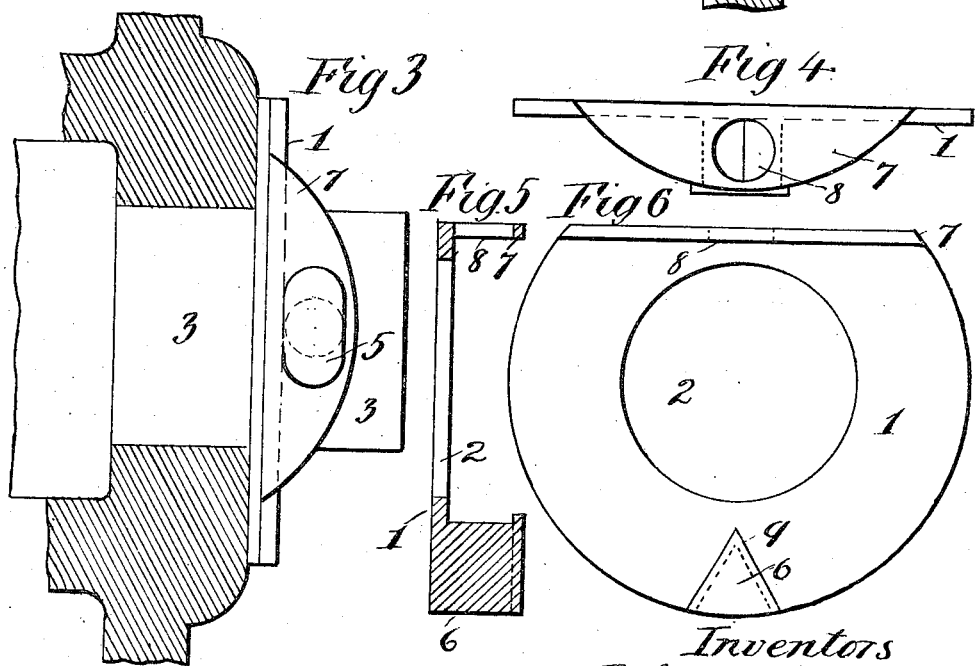
Inventors
Robert F. Phillips
Louis J. McCloskey
By Connolly Bros. Attys.

UNITED STATES PATENT OFFICE.

ROBERT F. PHILLIPS AND LOUIS J. McCLOSKEY, OF PITTSBURGH, PENNSYLVANIA, ASSIGNORS TO PHILLIPS MINE & MILL SUPPLY CO., OF PITTSBURGH, PENNSYLVANIA, A CORPORATION OF PENNSYLVANIA.

WASHER FOR MINE-CAR WHEELS.

1,423,877.          Specification of Letters Patent.      Patented July 25, 1922.

Application filed January 30, 1922. Serial No. 532,723.

*To all whom it may concern:*

Be it known that we, ROBERT F. PHILLIPS and LOUIS J. McCLOSKEY, citizens of the United States, residing at Pittsburgh, in the county of Allegheny and State of Pennsylvania, have invented certain new and useful Improvements in Washers for Mine-Car Wheels, of which the following is a specification, reference being had therein to the accompanying drawing.

This invention has relation to certain improvements in devices for preventing wear and displacement of linch or cotter pins applied to the axles of mine car wheels as described and illustrated in Letters Patent of the United States granted to us May 14th, 1912, No. 1,026,454.

The present improvement relates particularly to novel features in the form and construction of the washer, which in said Letters Patent is so formed as to protect the linch or cotter pin from contacting with the wheel hub and to take up the wear which is usually imposed upon the pin.

In the present invention we provide a washer or disk having a central aperture for the passage of the axle of a mine car and form the washer with a wedge shaped lug on its outer face, which, when the linch pin or cotter pin is placed in position in the axle, will project between the limbs of the pin and, by spreading the limbs apart, produce a locking effect and prevent the pin from being jolted or otherwise accidentally displaced. At the same time such wedge-shaped lug by its engagement with the end of the linch pin or cotter pin, prevents the washer from being turned by its frictional engagement with the car wheel and thus serves the function of the lugs on the washer of said Letters Patent. To prevent lateral movement of the washer the lug may be provided with a laterally projecting flange between which and the face of the washer the bifurcated end of the pin projects.

As an additional means for interlocking the washer and pin, the washer may be provided with an outwardly bent flange or lip opposite the interlocking lug and provided with a hole through which the pin projects. By means of said lug and flange the interlocking of the pin and washer is made substantially rigid and thus all friction between the pin and the washer obviated.

In the accompanying drawing illustrating our invention as applied to a mine car wheel:

Fig. 1, is a face view of the washer embodying our invention, as applied to a car wheel and axle.

Fig. 2, is a vertical central sectional view.

Fig. 3, is a horizontal sectional view.

Fig. 4, is an edge view of the washer.

Fig. 5, is a face view of the washer.

Fig. 6, is a vertical sectional view of the washer.

The washer, 1, is a circular disk of iron or steel having a central aperture, 2, through which the spindle, 3, of the car axle projects, the latter being bored vertically as at 4, for the reception of the bifurcated linch pin or cotter pin, 5, which is of the usual form, such pin being formed with divergent limbs which being pressed together to enable the pin to pass through the hole in the spindle of the axle, spread apart to prevent the pin from being accidentally dislodged.

The washer for the purposes of our invention is provided on its outer face with the angular or wedge-shaped lug, 6, which, when the linch pin is being inserted, is so located that its sides will be embraced by the divergent limbs of the pin, the angle of the lug entering the space between the limbs of the pin at their ends. This lug, in the position described, will act as an interlocking device to prevent the washer from turning and thus wearing away the linch pin. At the same time it will serve to keep the limbs of the pin sufficiently spread apart to prevent the pin from being dislodged from its seat.

As an additional security, the washer may be and preferably is formed with a flange or lip, 7, conveniently produced by bending outwardly a portion of the washer on a horizontal line, thus producing an arc-shaped flange. A hole, 8, is bored through the flange and the linch pin passed first through this hole and then through the hole in the spindle of the axle. By this means the linch pin or cotter pin is securely interlocked with the washer on opposite sides of the spindle of the axle. The flange 9 projecting from the lug 6 prevents lateral movement of the washer, the ends of the cotter pin lying back of said flange as shown.

We claim:

1. A washer for mine car axles, provided with a lug on its face adapted to fit between the limbs of the linch or cotter pin, by which the wheel is retained on the axle and to maintain such limbs in divergent relation and interlock the pin and washer, the washer being provided with means to prevent lateral movement in relation to the pin and axle.

2. A washer for mine car axles provided with a lug on, and projecting from, its face, adapted to maintain the limbs of the wheel-holding linch pin or cotter pin in divergent relation and interlock the pin and washer, and with a flange projecting from the face of the washer opposite said lug and having a hole for the passage of the pin.

3. A washer for mine car axles, provided with an outwardly extending bent over flange, pierced for the passage of a linch pin or cotter pin.

In testimony whereof we affix our signatures.

ROBERT F. PHILLIPS.
LOUIS J. McCLOSKEY.